US012589277B2

(12) United States Patent
Kuhrt

(10) Patent No.: US 12,589,277 B2
(45) Date of Patent: Mar. 31, 2026

(54) SMART SPORTS RESULT IMPLICATIONS

(71) Applicant: DISH Network L.L.C., Englewood, CO (US)

(72) Inventor: Chris Kuhrt, Englewood, CO (US)

(73) Assignee: DISH Network L.L.C., Englewood, CO (US)

( * ) Notice: Subject to any disclaimer, the term of this patent is extended or adjusted under 35 U.S.C. 154(b) by 245 days.

(21) Appl. No.: 18/436,254

(22) Filed: Feb. 8, 2024

(65) Prior Publication Data

US 2025/0256157 A1    Aug. 14, 2025

(51) Int. Cl.
*A63B 24/00*      (2006.01)
*H04N 21/437*    (2011.01)
*H04N 21/45*      (2011.01)
*H04N 21/81*      (2011.01)

(52) U.S. Cl.
CPC ....... *A63B 24/0062* (2013.01); *H04N 21/437* (2013.01); *H04N 21/4532* (2013.01); *H04N 21/8133* (2013.01)

(58) Field of Classification Search
CPC ............. A63B 24/0062; H04N 21/437; H04N 21/4532; H04N 21/8133
See application file for complete search history.

(56) References Cited

U.S. PATENT DOCUMENTS

2021/0368128 A1* 11/2021 Ellis .................. H04N 21/8126

* cited by examiner

*Primary Examiner* — Kevin Y Kim
(74) *Attorney, Agent, or Firm* — Wash Park IP Ltd.; John T. Kennedy

(57)                ABSTRACT
Systems, devices and methods for identifying content for impact events to users are described. A system may include a set top box ("STB"), an event server ("ES"), a stats server ("STATS"), and a user device ("UD"). The STB instantiates a preference application which determines a first user preferred first entity ("1UPFE"). Based on the 1UPFE a results implication application, instantiated by the STB, requests the ES to search for first events that correspond to the 1UPFE, requests an impact analysis of search results received from the ES, and notifies the UD when the impact analysis identifies an impact event. The STB may access user preference information to determine the 1UPFE. The UD may request a content server ("CS") to provide content for the impact event to the UD, store the content, and obtain and present additional data for the impact event to the user.

20 Claims, 8 Drawing Sheets

USER DEVICE (UD) 110

UD PROCESSOR (PUDP)
112

PUD EVENT APPLICATION
114

312

UD DATA STORE ("UDDS")
300

USER EVENT DATA
302

IMPACT EVENT CONTENT
DATA
303

UD USER
INTERFACE
304

UD COMM.
INTERFACE
306

UD SECURITY
308

UD POWER
310

SMART SPORTS RESULT IMPLICATIONS

TECHNICAL FIELD

The technology described herein generally relates to devices, systems, and methods by which a given user may be identified of content that a result of an event presented by the content may implicate a standing, ranking, placement, or otherwise of a person, team, or country with respect to which the given user has a preference for or against.

BACKGROUND

A given user may prefer a given person, team or the like. For example, a given user may prefer a given team, such as the KANSAS CITY CHIEFS, over other teams in the NFL®. The performance of one or more of the other NFL teams may impact one or more of the standings, playoff rankings, or otherwise of the CHIEFS®. While broadcasters and others often will identify in one or on-screen graphics or audibly, or otherwise provide information on a website, one or more past, present and/or upcoming events that may impact a given team, devices, systems and methods for notifying the given user when an impact event has, presently, or will occur are needed. Further, devices, systems and methods which facilitate the given user taking a given action in response to a notification of the impact event are needed.

Accordingly, devices, systems and methods are needed which address the above and other issues.

SUMMARY

Various implementations are described of devices, systems, and methods by which a given user may be identified of content which includes a result that may implicate a standing, ranking, placement or otherwise of a person, team, or country with respect to which the given user has a preference for or against.

In accordance with at least one implementation of the present disclosure, a system of one or more computers can be configured to perform particular operations or actions by virtue of having software, firmware, hardware, or a combination thereof installed on the system that, in operation, cause(s) the system to perform the actions. One or more computer programs can be configured to perform particular operations or actions by virtue of including instructions that, when executed by a data processing apparatus, cause the apparatus to perform the actions.

For at least one implementation, a system may include a set top box ("STB"); an event server ("ES") coupled to the STB; a stats server ("STATS") coupled to the STB; and a user device ("UD"), configured for use by a given user, coupled to the STB. The STB may include an STB processor ("STBP") and a non-transient STB data store, coupled to the STBP. The STB data store may store first computer instructions ("1CIs") which, when executed by the STBP, instantiate an STB preference application ("STBPA"). The STB data store may store second computer instructions ("2CIs"). The 2CIs, when executed by the STBP, instantiate an STB results implication application ("STBRIA"). The STBPA configures the STB to perform preference operations. The preference operations may include first determining a first user preferred first entity ("1UPFE") and first outputting data identifying the 1UPFE to the STBRIA.

The STBRIA may configure the STB to perform implication operations including: requesting a first search, by the ES, for first events that correspond to the 1UPFE and receiving, from the ES, a search result that includes a first event data set. The first event data set may identify, as a result of the first search, the first events that correspond to the 1UPFE. The implication operations may further include requesting an impact analysis, by the STATS, of the first events identified in the first event data set, receiving, from the STATS, an impact analysis of the first events, and sending a notification to the UD when the impact analysis identifies at least one of the first events as an impact event.

For at least one implementation, the preference operations may further include: second determining whether to provide data for the 1UPFE to the STBRIA. When a result of the second determining is positive the preference operations may include third determining if another UPFE (an "nUPFE") has been designated by the UD; and when the nUPFE has been designated, outputting data identifying the nUPFE to the STBRIA; and when the result of the second determining is negative: performing the first determining again.

For at least one implementation, the first determining may further include: accessing user preference data that identifies at least one user preference; and performing the first determining based on the user preference data. The first determining may be performed based on a standing of a given entity identified by the user preference data and the given entity may be a sports team.

For at least one implementation, the implication operations may include receiving an action instruction from the UD. The action instruction may identify at least one action the STB is to perform with regards to the impact event. The action instruction may instruct the STB to perform additional implication operations that include at least one of: requesting, from a content server ("CS"), a providing of content for the impact event to the UD; storing the content, for the impact event, for later presentation to the user; obtaining additional data regarding the impact event; and providing the additional data regarding the impact event to the UD for presentation by the UD to the given user. For an implementation, the content may be provided by the CS directly to the UD.

For at least one implementation, the ES may include an event server processor ("ESP"); and a non-transient event server data store, coupled to the event server processor, storing third computer instructions ("3CIs") which, when executed by the event server processor, instantiate an event server event application ("ESEA"). The ESEA may configure the ES to perform the first search by executing event search operations ("ESOs") that include: identifying, from the first event data set and as the first event, at least one event having one or more event characteristics that correspond to the 1UPFE; and further generating the first event data set based on results of the identifying.

For at least one implementation, the ESOs may include: second determining if another UPFE (an "nUPFE") has been designated by the UD. When a result of the second determining is positive, the ESOs may include: second searching for a second event having event characteristics that correspond to the nUPFE; generating a second event data set; third determining if the first event, in the first event data set, and the second event, in the second event data set, conflict; and when the first event and the second event conflict: de-conflicting the first event data set with the second event data set to produce a final event data set that includes at least one final event; and outputting the final event data set to the STBRIA.

For at least one implementation, the STATS may include a STATS processor ("STATSP") and a non-transient STATS data store, coupled to the STATSP, storing fourth computer instructions ("4CIs") which, when executed by the STATS processor, instantiates a STATS application ("STATSAPP"). The STATSAPP may configure the STATS to perform the impact analysis by executing STATS operations that include: receiving the final data set from the ES; determining if a final event, in the final event data set, will exceed an impact threshold; designating the final event as an impact event when the determining returns a positive result; and not designating the final event as an impact event when the determining returns a negative result. For at least one implementation, the impact threshold is a probability that an event will positively or negatively impact a standing of the 1UPFE.

For at least one implementation of the present disclosure a set top box ("STB") may include an STB processor ("STBP") and a non-transient STB data store, coupled to the STBP, storing first non-transient computer instructions ("1CIs") which, when executed by the STBP, instantiate an STB preference application ("STBPA") and second non-transient computer instructions ("2CIs") which, when executed by the STBP, instantiate an STB results implication application ("STBRIA"). The STBPA may configure the STB to perform preference operations including: first determining a first user preferred first entity ("1UPFE"); and first outputting data identifying the 1UPFE to the STBRIA. The STBRIA may configure the STB to perform implication operations including: requesting a first search, by an event server ("ES"), for first events that correspond to the 1UPFE; and receiving, from the ES, a search result that includes a first event data set. The first event data set may identify, as a result of the first search, the first events that corresponds to the 1UPFE. The implication operations may further include: requesting an impact analysis, by a stats server ("STATS"), of the first events identified in the first event data set; receiving, from the STATS, an impact analysis of the first events; and sending a notification to a user device ("UD") when the impact analysis identifies at least one of the first events as an impact event.

For at least one implementation, the preference operations may further include: second determining whether to provide data for the 1UPFE to the STBRIA. When a result of the second determining is positive the preference operations may include third determining if another UPFE (an "nUPFE") has been designated by the UD. When the nUPFE has been designated, the preference operations may include outputting data identifying the nUPFE to the STBRIA. When the result of the second determining is negative, the preference operations may include performing the first determining again.

For at least one implementation, the first determining may further include accessing user preference data that identifies at least one user preference and performing the first determining based on the user preference data.

For at least one implementation, the implication operations may further include receiving an action instruction from the UD. The action instruction may identify at least one action the STB is to perform with regards to the impact event.

For at least one implementation, the action instruction may instruct the STB to perform additional implication operations that include at least one of: requesting, from a content server ("CS"), a providing of content for the impact event to the UD; storing the content, for the impact event, for later presentation to the user; obtaining additional data regarding the impact event; and providing the additional data regarding the impact event to the UD for presentation by the UD to a given user.

For at least one implementation of the present disclosure, a method may include: first determining a first user preferred first entity ("1UPFE"); first outputting data identifying the 1UPFE to a set top box results implication application ("STBRIA"); requesting a first search, by an event server ("ES"), for first events that correspond to the 1UPFE; and receiving, from the ES, a search result that includes a first event data set. The first event data set may identify, as a result of the first search, the first events that corresponds to the 1UPFE. The method may further include: requesting an impact analysis, by a stats server ("STATS"), of the first events identified in the first event data set; receiving, from the STATS, an impact analysis of the first events; and sending a notification to a user device ("UD") when the impact analysis identifies at least one of the first events as an impact event.

For at least one implementation, the method may include: second determining whether to provide data for the 1UPFE to the STBRIA. When a result of the second determining is positive, the method may include third determining if another UPFE (an "nUPFE") has been designated by the UD. When the nUPFE has been designated, the method may include outputting data identifying the nUPFE to the STBRIA. When the result of the second determining is negative, the method may include performing the first determining again.

For at least one implementation, the method may include accessing user preference data that identifies at least one user preference and performing the first determining based on the user preference data.

For at least one implementation, the method may include receiving an action instruction from the UD. The action instruction may identify at least one action the STB is to perform with regards to the impact event.

BRIEF DESCRIPTION OF THE DRAWINGS

The features, aspects, advantages, functions, modules, and components of the devices, systems, and methods provided by the various implementations of the present disclosure are further disclosed herein regarding at least one of the following descriptions and accompanying drawing figures. In the appended figures, similar components or elements of the same type may have the same reference number and may include an additional alphabetic designator, such as 108a-108n, and the like, wherein the alphabetic designator indicates that the components bearing the same reference number, e.g., 108, share common properties and/or characteristics. Further, various views of a component may be distinguished by a first reference label followed by a dash and a second reference label, wherein the second reference label is used for purposes of this description to designate a view of the component. When the first reference label is used in the specification, the description is applicable to any of the similar components and/or views having the same first reference label irrespective of any additional alphabetic designators or second reference labels, if any.

DETAILED DESCRIPTION

Figure 1:
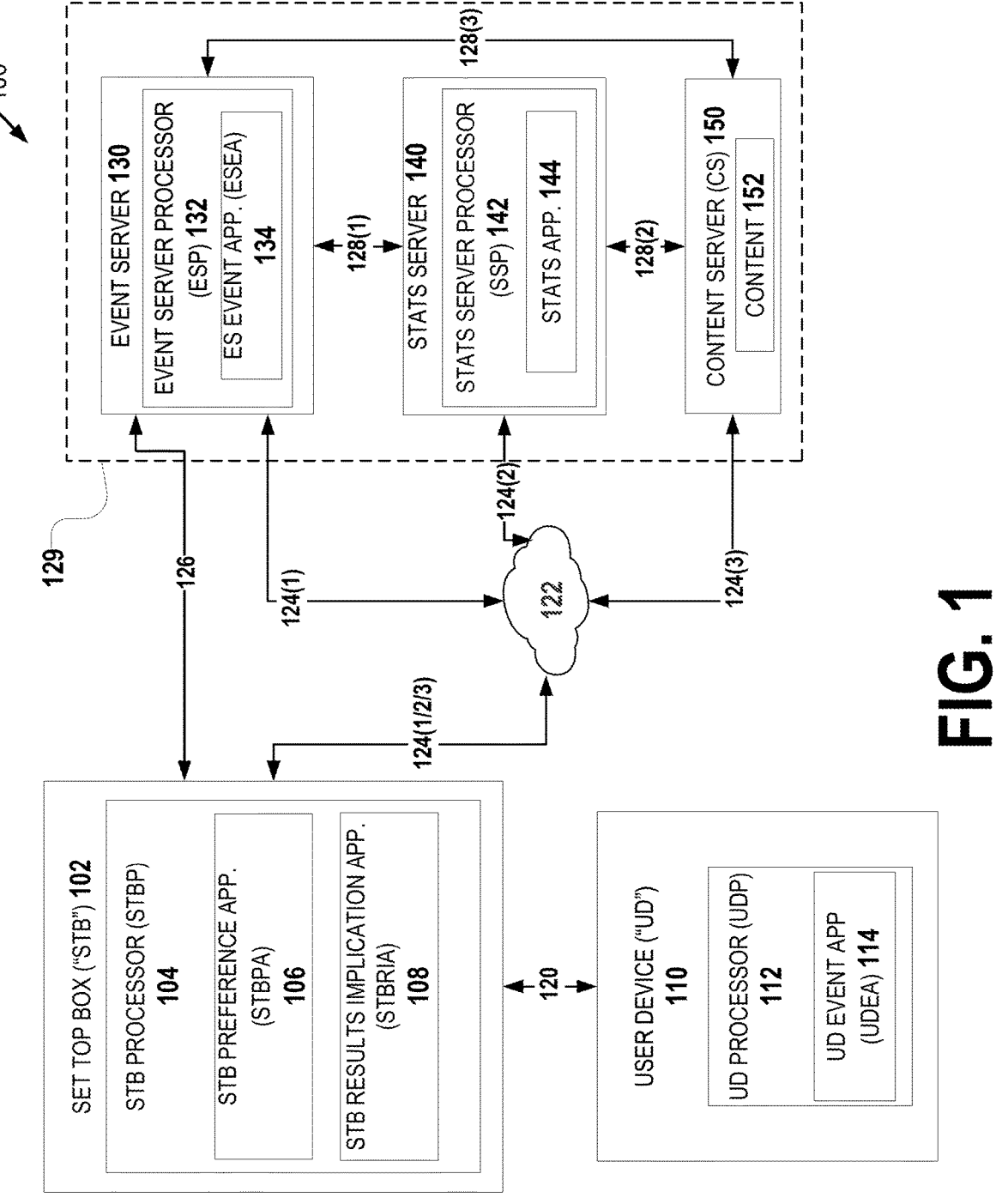
FIG. 1 is a schematic illustration of an implementation of a sports results implications system and in accordance with at least one implementation of the present disclosure.

Various implementations of the present disclosure describe devices, systems, and methods by which a given user may be notified of one or more "impact events" and actions in response thereto may be taken.

"Additional I/O interface" (AIOI) herein refers to one or more components, provided with or coupled to a device, configured to support a receiving and/or presenting of additional inputs and outputs to and from one or more users. An AIOI may be configured to support the receiving and presenting of the additional I/O content (AIO) to users. Herein, the AIO, as communicated, may be referred to as "AIO signals." An AIO signal may include an audible signal or a visible signal and may be communicated separately or collectively therewith. An AIOI may include any interface not otherwise categorized as an Audio I/O interface or a Visual I/O interface with non-limiting examples including touch pads, keyboards, sensors, motion detectors, tactile elements, and the like. Any known or later arising technologies configured to convey information to or from one or more users as an AIO signal may be utilized for at least one implementation of the present disclosure. An AIOI includes hardware and computer instructions (herein, "AIO technologies") which supports the input and output of other signals with a user.

"Application" herein refers to a set of computer instructions that configure one or more processors to perform one or more tasks that are other than tasks commonly associated with the operation of the processor itself (e.g., a "system software," an example being an operating system software), or the providing of one or more utilities provided by a device (e.g., a "utility software," an example being a print utility). An application may be bundled with a given device or published separately. Non-limiting examples of applications include word processing applications (e.g., Microsoft WORD™), video streaming applications (e.g., SLINGTV™), video conferencing applications (e.g., ZOOM™), gaming applications (e.g., FORTNITE™), and the like.

"Audio I/O interface" herein refers to one or more components, provided with or coupled to an electronic device, configured to support a receiving and/or presenting of humanly perceptible audible content to one or more users. Such audible content (which is also referred to herein as being "audible signals") may include spoken text, sounds, or any other audible information. Such audible signals may include one or more humanly perceptible audio signals, where humanly perceptible audio signals typically arise between 20 Hz and 20 KHz. The range of humanly perceptible audio signals may be configurable to support an audible range of a given individual user. An audio I/O interface includes hardware and computer instructions (herein, "audio technologies") which supports the input and output of audible signals to a user. Such audio technologies may include, but are not limited to, noise cancelling, noise reduction, technologies for converting human speech to text, text to speech, translation from a first language to one or more second languages, playback rate adjustment, playback frequency adjustment, volume adjustments and otherwise. An audio I/O interface may use one or more microphones and speakers to capture and present audible signals respectively from and to a user. Such one or more microphones and speakers may be provided by a given device itself or by a device communicatively couple additional audible device component. For example, earbuds may be communicatively coupled to a smartphone, with the earbuds functioning as an audio I/O interface and capturing and presenting audio signals as sound waves to and from a user, while the smartphone functions as a UD. An audio I/O interface may be configured to automatically recognize, and capture comments spoken by a user and intended as audible signals for sharing with other users, inputting commands, or otherwise.

"Bus" herein refers to any known and/or later arising technologies which facilitate the transfer of data within and/or between components of a device. Non-limiting examples include Universal Serial Bus (USB), PCI-Express, Compute Express Link (CXL), IEEE-488 bus, High Performance Parallel Interface (HIPPI), and the like.

"Cloud" herein refers to cloud computing, cloud storage, cloud communications, and/or other technology resources which a given user does not actively manage or provide. A usage of a Cloud resource may be private (limited to various users and/or uses), public (available for multiple users and/or uses), hybrid, dedicated, non-dedicated, or otherwise. It is to be appreciated that implementations of the present disclosure may use Cloud resources to provide for processing, storage and other functions related to facilitating AET functions. An implementation may utilize Cloud resources using any known or later arising data delivery, processing, storage, virtualization, or otherwise technologies, standards, protocols (e.g., the Simple Object Access Protocol (SOAP), the Hyper Text Transfer Protocol (HTTP), Representational State Transfer protocol (REST), or the like. Non-limiting examples of such technologies include Software as a Service (SaaS), Platform as a Service (Paas), Infrastructure as a Service (Iaas), and the like. Cloud resources may be provided by one or more entities, such as AMAZON WEB SERVICES provided by Amazon.com Inc., AZURE provided by Microsoft Corp., and others.

"Component" herein refers to a Module of a Device, as further defined herein.

"Computer Data" herein refers to Data, as further defined herein.

"Computer engine" (or "engine") herein refers to a combination of a processor and computer instruction(s). A computer engine executes computer instructions to perform one or more logical operations (herein, a "logic") which facilitate various actual (non-logical) and tangible features and function provided by a system, a device, and/or combinations thereof.

"Computer instruction" herein refers to an Instruction, as further defined herein.

"Communications Interface" herein refers to one or more separately provided components and/or integrated with other components of a Device that is configured to facilitate communication of data with one or more other devices using a Coupling. Non-limiting examples of communications interfaces including networking cards, Wi-Fi™ modules, Ethernet ports, Bluetooth radio modules, wireless radio modules, and the like. Any known or later arising components, technologies, protocols, communications mediums, or the like may be used as a communications interface in a given device in a sports results implications system.

"Content" herein refers to data that that may be presented, using a suitable presentation device, to a user in a humanly perceptible format. When presented to a human, the data becomes "information." Non-limiting examples of content include images and graphics such as those related to television programs, streaming video, music, or otherwise. Content may include, for example and not by limitation, one or more sounds, images, video, graphics, gestures, or otherwise. The content may originate from any source, including live and/or recorded, augmented reality, virtual reality, computer generated, or otherwise. The content may be presented to a given user using any user device and any user interface. Content may be stored, processed, communicated, or otherwise utilized. Content may identify artists, events, venues or the like.

"Coupling" herein refers to the establishment of a communications link between two or more elements of a given system. A coupling may utilize any known and/or later arising communications and/or networking technologies, standards, protocols or otherwise. Non-limiting examples of such technologies include packet switch and circuit switched communications technologies, with non-limiting examples including, Wide Area Networks (WAN), such as the Internet, Local Area Networks (LAN), Public Switched Telephone Networks (PSTN), Plain Old Telephone Service (POTS), cellular communications networks such as a 3G/4G/5G or other cellular network, IoT networks, Cloud based networks, private networks, public networks, or otherwise. One or more communications and networking standards and/or protocols may be used, with non-limiting examples including, the TCP/IP suite of protocols, ATM (Asynchronous Transfer Mode), the Extensible Message and Presence Protocol (XMPP), Voice Over IP (VOIP), Ethernet, Wi-Fi, CDMA, Z-WAVE, Near Field Communications (NFC), GSM/GRPS, TDMA/EDGE, EV/DO, WiMAX, SDR, LTE, MPEG, BLUETOOTH, and others. A coupling may include use of physical data processing and communication components. A coupling may be physically and/or virtually instantiated. Non-limiting examples of physical network components include data processing and communications components including computer servers, blade servers, switches, routers, encryption components, decryption components, and other data security components, data storage and warehousing components, and otherwise. Any known or later arising physical and/or virtual data processing and/or communications components may be utilized for a given coupling.

"Data" herein refers to any representation of facts, information or concepts in a form suitable for processing, storage, communication, or the like by one or more electronic device processors, data stores, routers, gateways, or other data processing and/or communications devices and systems. Data, while and/or upon being processed, may cause or result in an electronic device or other device to perform at least one function, task, operation, provide a result, or otherwise. Data may be communicated, processed, stored and/or otherwise exist in a transient and/or non-transient form, as determined by any given state of such data, at any given time. For a non-limiting example, a given data packet may be non-transient while stored in a storage device, but transient during communication of the given data packet from a first device or system to a second (or more) device or system. When received and stored in one or more of a cache, a memory, a data storage device, or otherwise, the given data packet has a non-transient state. For example, and not by limitation, data may take any form including as one or more applications, content, or otherwise. Instructions, as further described herein, are a form of data.

"Data store" herein refers to any non-transient device, combinations of devices, component of a device, combinations of components of one or more devices, or the like configured to store data on a temporary, permanent, non-transient, or other basis. A data store is also referred to herein as a "computer readable medium" and/or a "non-transitory computer readable medium." A data store may store data in any form, such as electrically, magnetically, physically, optically, or otherwise. A data store may include a cache on a processor, memory devices, with non-limiting examples including random access memory (RAM) and read only memory (ROM) devices, and the like. A data store may include one more storage devices, with non-limiting examples including electrical storage drives such as EEPROMs, Flash drives, Compact Flash (CF), Secure Digital (SD) cards, Universal Serial Bus (USB) cards, and solid-state drives, optical storage drives such as DVDs and CDs, magnetic storage drives such as hard drive discs, magnetic drives, magnetic tapes, memory cards, and others. Any known or later arising data storage device technologies may be utilized for a given data store. Available storage provided by a given one or more data stores may be partitioned or otherwise designated by a storage controller as providing for permanent storage and temporary storage. Non-transient data, computer instructions, or other the like may be suitably stored in a data store permanently or temporarily. As used herein, permanent storage is distinguished from temporary storage, with the latter providing a location for temporarily storing data, variables, or other instructions used for a then arising or soon to arise data processing operations. A non-limiting example of a temporary storage is a memory component provided with and/or embedded onto a processor or integrated circuit provided therewith for use in performing then arising data calculations and operations. Accordingly, it is to be appreciated that a reference herein to "temporary storage" is not to be interpreted as being a reference to transient storage of data. Permanent storage and/or temporary storage may be used to store data which, while communicated may be transient or non-transient, but while stored, is defined herein to be a form of non-transient data.

"Device" and "electronic device" herein refer to any known or later arising electrical device configured to, singularly and/or in combination, communicate, manipulate, output (e.g., for presentation as information to a human), process, store, or otherwise utilize data. Non-limiting examples of devices include User Devices, Set Top Boxes, and Servers.

"Entity" refers to a human being, an animal, a robot, an artificial intelligence, or a combination or collection of two or more of the foregoing that participate in a given event.

"Event" refers to a given type of activity by an entity. For a non-limiting example, an event may be a human activity (e.g., a football game) undertaken by two or more entities (e.g., multiple sporting teams or players—with "entity" being further defined below), and where multiple instances of the same type of given activity (e.g., multiple teams participating in multiple football games) occur in order to establish a ranking, standing, position, hierarchy, or the like amongst the two or more entities and with respect to the type of given activity. For at least one implementation, another non-limiting example of an event is a sporting competition, such as an NFL football game, where the rankings of a first team (e.g., the CHIEFS) in the NFL playoff standings is influenced by the performance of a second team (e.g., the DENVER BRONCOS in other NFL games) that may (or may not) include the CHIEFS as a participant therein. For at least another implementation, non-limiting examples of an event include political competitions, spelling bees, art shows, and/or any activity where the relative standing, position, title, recognition or ranking of one entity is influenced by the performance (or non-performance) of another entity and with respect to the given type of activity.

"Event Characteristic" herein refers to data, which may include metadata, which identifies one or more attributes, features, qualities, properties, traits, aspects, elements, facets, styles, tone, members, performers, specialties, directors, or the like for a given impact event. For a non-limiting example, an event characteristic may identify a given impact event as being performed by a given entity, such as a college football game being performed by a given college or university. For another non-limiting example, an event characteristic may identify a given person as performing in a given impact event, such as an actor performing in a movie, a singer performing a song, or otherwise.

"Impact event" refers to an event that may impact, and/or has impacted a "standing" (as described below) of given user's preferred team, player, or the like. An impact event is further defined as an event that includes one or more other entities (such as another team, player or the like) and does not include the preferred first entity as a participant in the impact event. For example, during an NFL season, the performance of other NFL teams, in other events that do not include the CHEIFS as a participant therein, may impact the standing of the CHIEFS. For example, during an NFL playoff race, the performance of another NFL team such as the BALTIMORE RAVENS, may impact the playoff standings of the CHIEFS. Accordingly, for this example, the performance of the RAVENS in another NFL football game would be an impact event vis-à-vis a given user's preferred first entity, e.g., the CHIEFS.

"Impact event action" refers to an action taken by a user device and/or another device coupled thereto which, upon being notified of an impact event, presents information to a given user regarding the impact event and upon user input, semi-automatically and/or automatically provides the user access to information and/or content regarding the impact event that the given user may have presented to them at a given time, such as at a then occurring time, at a later time, or otherwise. For a non-limiting example, an impact event may include the RAVENs participation in a given event and a corresponding impact event action may include the given user device receiving a notification of the impact event, presenting the notification to the given user, and taking some action, such as tuning to a broadcast or other presentation of the impact event, selecting content regarding the impact event for presentation at that time or later, and/or taking other actions regarding data concerning the impact event.

For example, the user device and/or a device coupled thereto may perform one or more impact event data analysis operations, such as predicting an impact of an impact event on a standing of the preferred first entity, other entities, or the like. Various implementations of the present disclosure also describe devices, systems and processes which facilitate a given user device manually, semi-automatically and/or automatically taking one or more "impact event actions" in response to the user device receiving a notification of an impact event.

"Information" herein refers to data provided in a humanly perceptible and understandable format.

"Instruction" herein refers to a non-transient processor executable instruction, associated data structures, sequence of operations, program modules, or the like. An instruction is described by an instruction set. It is commonly appreciated that instruction sets are often processor specific and accordingly an instruction may be executed by a processor in a language format (e.g., a machine language format) that is translated from a higher level programming language (e.g., C++). An instruction may be provided using any form of known or later arising programming; non-limiting examples including declarative programming, imperative programming, functional programming, procedural programming, stack based programming, object-oriented programming, and otherwise. An instruction may be performed by using data and/or content stored in a data store on a transient and/or non-transient basis, as may arise for any given data, content and/or instruction.

"Module" herein refers to and, when claimed, recites definite structure for a device that is configured to provide at least one feature and/or output signal and/or perform at least one function including one or more of the features, output signals and functions described herein. A module may provide the one or more functions using computer engines, processors, computer instructions, and the like. When a feature, output signal and/or function is provided, in whole or in part, using a processor, one more software components may be used, and a given module may include a processor configured to execute computer instructions. A person having ordinary skill in the art (a "PHOSITA") will appreciate that the specific hardware and/or computer instructions used for a given implementation will depend upon the functions to be accomplished by a given module. Likewise, a PHOSITA will appreciate that such computer instructions may be provided in firmware, as embedded software, provided in a remote and/or local data store, accessed from other sources on an as-needed basis, or otherwise. Any known or later arising technologies may be used to provide a given module and the features and functions supported therein.

"Power Supply/Power" herein refers to any known or later arising technologies which facilitate the providing to and/or use by a device of electrical power. Non-limiting examples of such technologies include batteries, power converters, inductive charging components, line-power components, solar power components, and otherwise.

"Processor" herein refers to one or more known and/or later developed hardware processors and/or processor systems configured to execute one or more computer instructions, with respect to one or more instances of computer data, and perform one or more logical operations. The computer instructions may include instructions for executing one or more applications, software engines, and/or processes configured to perform computer executable operations. Such hardware and computer instructions may arise in any computing configuration including, but not limited to, local, remote, distributed, blade, virtual, or other configurations and/or system configurations. Non-limiting examples of processors include discrete analog and/or digital components that are integrated on a printed circuit board, as a system on a chip (SOC), or otherwise; Application specific integrated circuits (ASICs); field programmable gate array (FPGA) devices; digital signal processors; general purpose processors such as 32-bit and 64-bit central processing units; multi-core ARM based processors; microprocessors, microcontrollers; and the like. Processors may be implemented in single or parallel or other implementation structures, including distributed, Cloud based, and otherwise.

"Security Component/Security" herein refers to any known or later arising components, processors, computer instructions, modules, and/or combinations thereof configured to secure data as communicated, processed, stored, output for presentation to a user, or otherwise manipulated. Non-limiting examples of security components include those which implement encryption/decryption standards, such as an Advanced Encryption Standard (AET), and transport security standards, such as Transport Layer Security (TLS) or Secure Sockets Layer (SSL).

"Server" herein refers to one or more devices that include computer hardware and/or computer instructions that provide functionality to one or more other programs or devices (collectively, "clients"). Non-limiting examples of servers include content servers, database servers, file servers, application servers, web servers, communications servers, virtual servers, computing servers, and the like. Servers may be combined into clusters (e.g., a server farm), logically or geographically grouped, combined into neural networks, or otherwise configured and/or utilized. Any known or later arising technologies may be used for a server.

A server may instantiate one or more computer engines as one or more threads operating on a computing system having a multiple threaded operating system, such as the WINDOWS, LINUX, APPLE OS, ANDROID, and other operating systems, as an application program on a given device, as a web service, as a combination of the foregoing, or otherwise. An Application Program Interface (API) may be used to support an implementation of the present disclosure. A server may be provided in the virtual domain and/or in the physical domain. A server may be associated with a human user, a machine process executing on one or more computing devices, an API, a web service, instantiated on the Cloud, distributed across multiple computing devices, or otherwise. A server may be any electronic device configurable to communicate data using a network, directly or indirectly, to another device, to another server, or otherwise.

"Set Top Box" (STB) herein refers to one or more devices, servers, data stores, communications interfaces, and related components which, singularly and/or cooperatively, facilitate one or more features and functions of the present disclosure. An STB may include one or more processors, data stores, communications interfaces, user interfaces, busses, and related components. Non-limiting examples of STBs include satellite receivers, such as a HOPPER™ by DISH Network L.L.C. of Englewood, Colorado, streaming devices, such as an APPLE TV® by Apple, Inc. of Cupertino California, a streaming application and/or streaming server, such as a NETFLIX® application and/or NETFLIX server provided by Netflix Inc. of Los Gatos, California, a smart television, such as a QE1C QLED 4K® television by Samsung corporation of Samsung Digital City, South Korea, a cable receiver, such as an X1® television box by XFINITY Inc., a division of Comcast Inc. of Philadelphia, Pennsylvania, and/or any other device, component, software, application or the like configured to singularly or cooperatively facilitate one or more features and functions of the present disclosure. The STB devices, components and the like may be physically, logically, virtually, or otherwise grouped and/or coupled to facilitate the one or more features and functions including, but not limited to, those identified herein.

"Standing" herein refers to a rank, position, statistical categorization, hierarchical order, status, social position, level, reputation, stature, condition, degree, placement, prestige, or the like of an entity at a given time and/or over a given period.

"Substantially simultaneous(ly)" herein refers to an absence of a greater than expected and humanly perceptible delay between a first event or condition and a second event or condition. Substantial simultaneity may vary in a range of quickest to slowest expected delay, to a moderate delay, or to a longer delay. For at least one implementation, substantial simultaneity occurs within an acceptable delay (as described above).

"Trick-play operation" refers to an operation performed alone and/or in combination by a user device and/or an STB and by which a given presentation of a given content may be started, stopped, paused, reversed, fast reversed, forwarded, fast forwarded, skipped, or otherwise manipulated by a user providing user inputs to a given user device. Such user inputs may be provided to the given user device by use of a user interface (as defined below).

"User" herein refers to one or more of a single person, a household of people (such as those in a family), a collection of people (e.g., those in a fraternal organization or a club), or any other association of one or more human beings. A given household may have multiple users and/or collections of users (e.g., parents being one collection of users with children being a second collection of users in a household).

"User Device (UD)" herein refers to a device configured for use by a user to communicate, generate, compute, present, process, store, or otherwise manipulate data and/or information. Non-limiting examples of user devices include smartphones, laptop computers, tablet computing devices, desktop computers, smart televisions, smart glasses, virtual reality glasses, augmented reality glasses, earbuds/headphones and other audible output devices, and other devices.

"User Interface" herein refers to one more components, provided with or coupled to a device configured to receive information from and/or present information to a user and convert information to data and vice versa. A user interface may include one more Additional I/O interfaces, Audio I/O interfaces, and Visual I/O interfaces.

"User Preferred First Entity" ("UPFE") herein refers to a preferred team, person, or the like of a given user. For a non-limiting example, a given user may prefer the CHIEFS over other NFL teams. For example, the CHIEFS may be a preferred first entity for the given user.

"Visual I/O interface" herein refers to one or more components, provided with or coupled to a device, configured to support a receiving and/or presenting of humanly perceptible visual content to one or more users. A visual I/O interface may be configured to support the receiving and presenting of visual content (which is also referred to herein as being "visible signals") to users. Such visible signals may be in any form, such as still images, motion images, augmented reality images, virtual reality images, and otherwise. A visual I/O interface includes hardware and computer instructions (herein, "visible technologies") which supports the input by and output of visible signals to users via a device. Such visible technologies may include technologies for converting images (in any spectrum range) into humanly perceptible images, converting content of visible images into a given user's perceptible content, such as by character recognition, translation, playback rate adjustment, playback frequency adjustment, and otherwise. A visual I/O interface may be configured to use one or more display devices, such as an internal display and/or external display for a given device with the display(s) being configured to present visible signals to a user. A visual I/O interface may be configured to use one or more image capture devices to capture content. Non-limiting examples of image capture devices include lenses, cameras, digital image capture and processing software, and the like. Accordingly, it is to be appreciated that any existing or future arising visual I/O interfaces, devices, systems and/or components may be utilized by and/or in conjunction with a device to facilitate the capture, communication and/or presentation of visible signals to a user.

Sports Results Implications System 100

As shown in FIG. 1 and for at least one implementation of the present disclosure, a sports results implications system ("SRIS") 100, may include a set top box ("STB") 102, a user device ("UD") 110, and one or more servers 129. The STB 102 may be coupled to the UD 110 by a first coupling 120. The STB 102 may be indirectly coupled to the one or more servers by one or more second couplings 124 and/or directly coupled by one or more third couplings 126. One or more of the first coupling 120 and/or second couplings 124 may include use of a wide area network, such as the Internet 122. For at least one implementation, the one or more servers 129 may occur actually and/or virtually and may include an event server ("ES") 130, a statistics server ("STATS") 140 and a content server ("CS") 150. The one or more servers 129 may be coupled by one or more actual and/or virtual fourth couplings 128.

As further shown in FIG. 1 and as further described below with reference to FIG. 2, the STB 102 may include an STB processor ("STBP") 104 configured to execute first non-transient computer instructions which instantiate an STB preference application ("STBPA") 106 and second non-transient computer instructions which instantiate an STB results implication application ("STBRIA") 108. Other applications, engines, and the like may also be instantiated by the STBP 104 by execution of computer instructions corresponding thereto.

As further shown in FIG. 1 and as further described below with reference to FIG. 3, the UD 110 may include a UD processor ("UDP") 112 that is configured to execute third non-transient computer instructions which instantiate (when so executed in whole or in part) a UD event application ("UDEA") 114.

As further shown in FIG. 1, the event server (ES) 130 may include an event server processor ("ESP") 132 configured to execute fourth non-transient computer instructions which instantiate (when so executed in whole or in part) an ES event application ("ESEA") 134. Other applications, engines, and the like may also be instantiated by the ESP 132.

As further shown in FIG. 1, the STATS 140 may include a statistics server processor ("STATSP") 142 configured to execute fifth non-transient computer instructions which instantiate (when so executed in whole or in part) a statistics application ("STATSAPP") 144. Other applications, engines, and the like may also be instantiated by the STATSP 142.

As further shown in FIG. 1, the content server (CS) 150 may include one or more instances of content 152. The content may be provided live, recorded, or otherwise. The content server 150 may include any device, system, process, or collections thereof which are configured to provide content 152 to one or more UDs 110 on a live, recorded, broadcast, unicast, streamed, download, or other basis. Non-limiting examples of content servers may include cable systems such as COMCAST, satellite broadcast systems such as DISH, streaming systems such as NETFLIX, YOU-TUBE, social media providers such as FACEBOOK, TIK-TOK, and others, and the like.

STB 102

Figure 2:
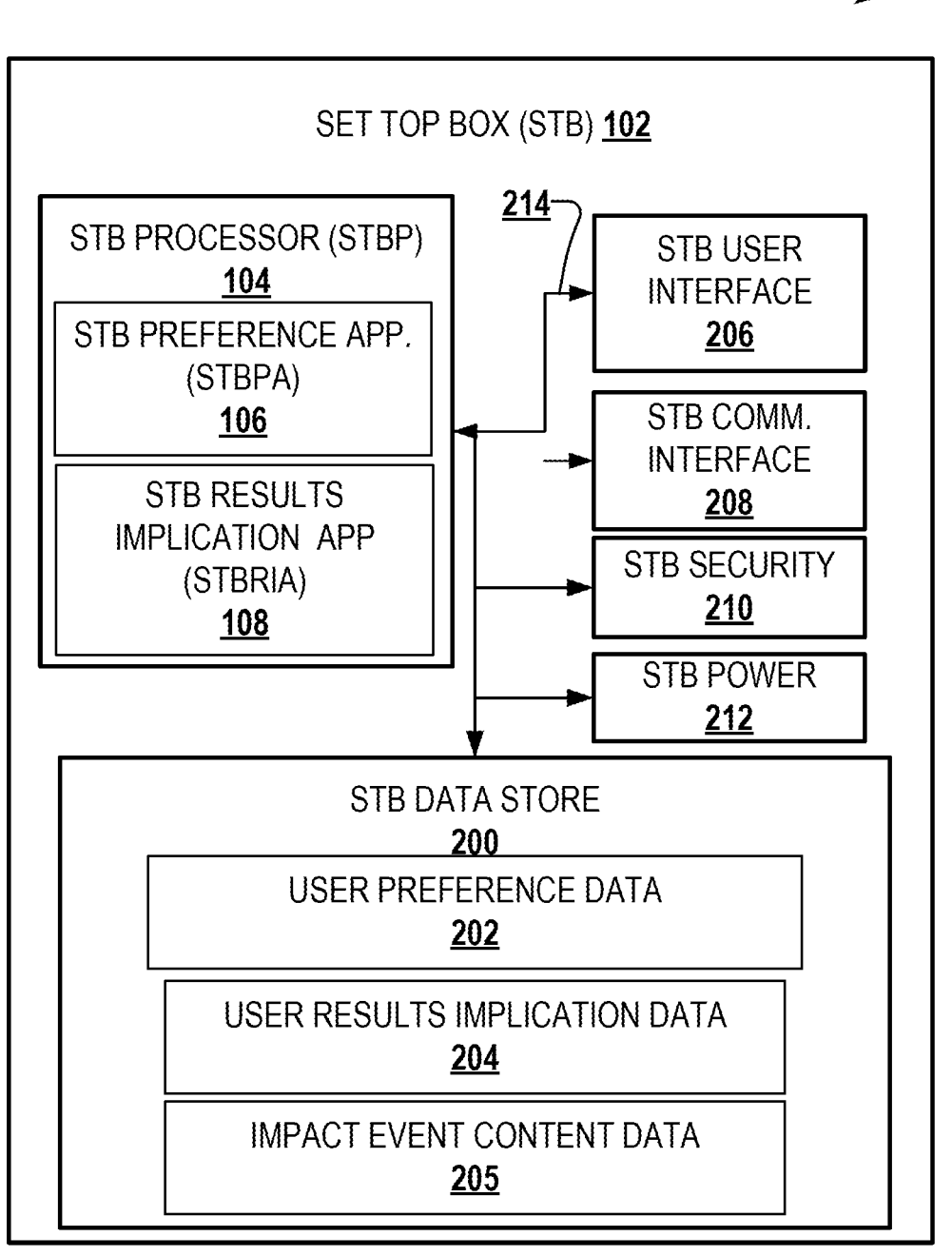
FIG. 2 is a schematic illustration of a set top box ("STB") configured for use in the sports results implications system of FIG. 1 and in accordance with at least one implementation of the present disclosure.

As shown in FIG. 2 and for at least one implementation, the STBP 104 is coupled to an STB data store 200, an STB user interface 206, an STB communications interface 208, an STB security module 210, an STB power module 212, and an STB bus 214. As discussed above, the STBP 104 may be configured to execute the STBPA 106 and the STBRIA 108. Other applications, such as content processing applications, web browser applications, and the like may also be executed by the STB 102. The STB data store 200 is configured to store the user preference data 202 and user results implication data 204. Other data may be stored by the STB data store 200.

STB Preference Application (STBPA) 106

The STBP 104 may be configured to execute "first" non-transient computer instructions ("1CIs") which instantiate the STBPA 106. The 1CIs may be stored in the STB data store 200, provided on the Cloud, or otherwise accessible by the STB 102.

Figure 4:
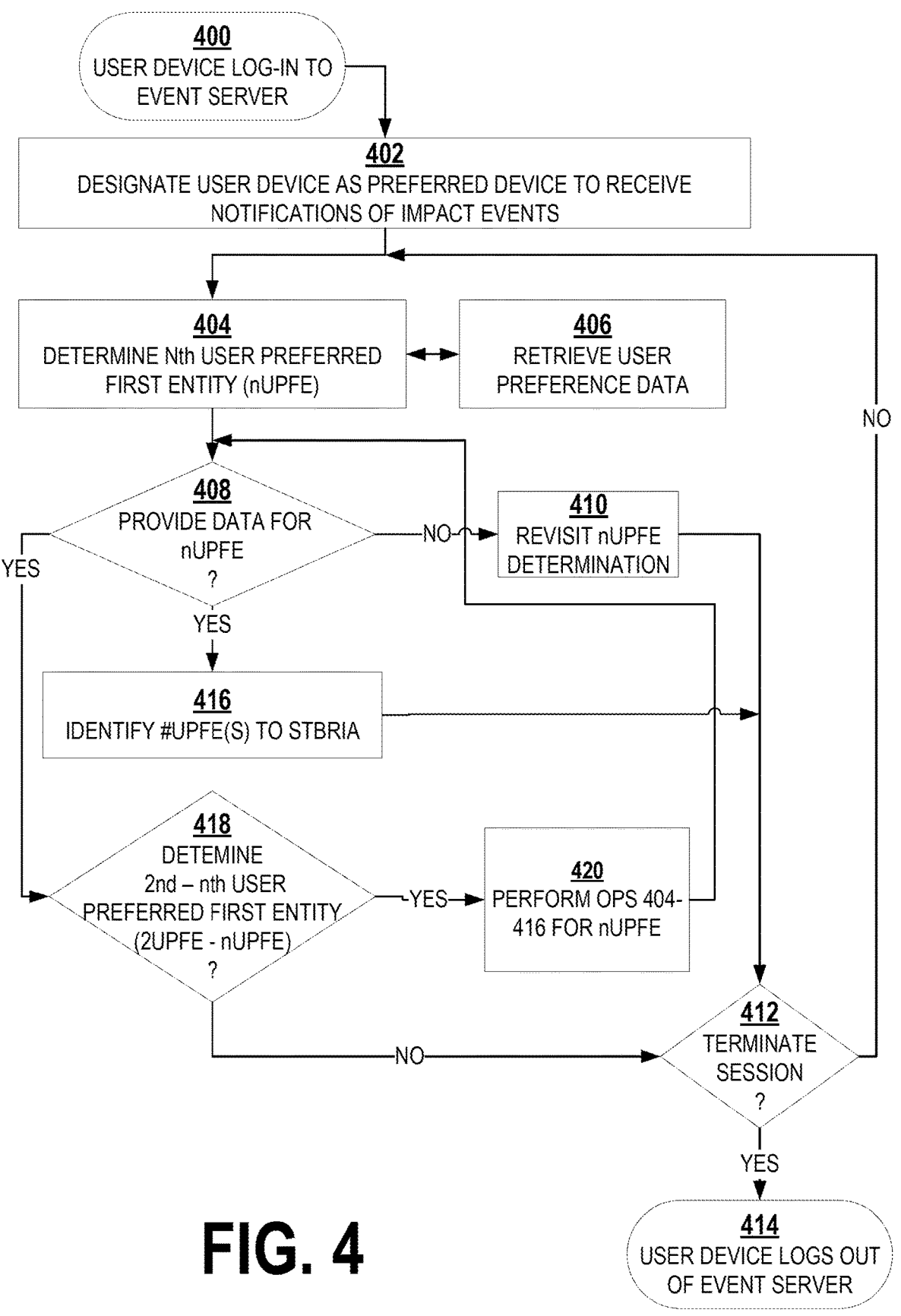
FIG. 4 is a flow chart illustrating operations performed by a preference application instantiated by a set top box for a sports results implications system and in accordance with at least one implementation of the present disclosure.

As shown in FIG. 4, operations performed by the STBPA 106 and in accordance with at least one implementation of the present disclosure include operations for determining one or more preferred first entities (herein, "preference operations") of a given user and with respect to which data regarding events are to be monitored by the STBRIA 108 and when an impact event is detected, such impact event may be identified to a given user and one or more, if any, subsequent further operations in response thereto may occur.

As per Operation 400, the preference operations may include the given user device logging into the event server (ES_130, via the STB 102. Such log-in may occur using a UD 110 coupled directly or indirectly to STB 102 and/or to the ES 103. When logging-in, the given user may provide, via the UD 110, user identifiable information including username, password and two-factor authenticator. Such user identifiable information may be tied to an account previously established or then established with the ES 130. The user identifiable information may be stored on one or more of the STB 102 and the ES 130

As per Operation 402, upon the user device logging in with the ES 130, the STBPA 106 will receive a confirmation thereof and the preference operations may include the STB 102 designating the given user device as a preferred device to receive notifications of impact events. For at least one implementation, the given user device logging-in to the ES 130 indicates to the STB 102 that the given user, as associated with the logged in UD 110, desires to receive notifications of impact events via the logged in UD 110. It is to be appreciated that a given user may have access to multiple user devices, e.g., a smartphone, a television, a laptop, or the like, which are coupled and/or may be coupled to the STB 102 at any given time to receive other data, including content 152. Further, the given user may desire to receive notifications of impact events on one of more of such multiple UDs 110 while not receiving notifications of impact events on another of the multiple UDs 110. Further, a given STB 102 and/or UD 110 associated with a given user may be coupled to one or more of the STATS 140 and/or CSs 150 to receive data therefrom and be presented with various information, such as statistical information, content, and other information. Accordingly, for at least one implementation, the UD 110 logged into the ES 130 being designated as the UD 110 at which information regarding impact events is to be presented to the given user.

As per Operation 404, the preference operations may include the STB 102 determining at least one user preferred first entity ("UPFE"), with a first UPFE herein being identified as the "1UPFE." It is to be appreciated that a given user may have multiple UPFEs at any given time, such multiple UPFEs being identified herein as an "nUPFE" and where "n" is an integer. One or more of the nUPFEs, may be influenced, at any given time, by impact events, while another of the nUPFEs is not influenced by impact events. For example, a given user may have preferences for the CHIEFS, the NUGGETS® (a member of the NBA®), the WILDCATS (a member of the NCAA®) and the ROCKIES® (a member of MLB®. At any given time, impact events regarding one or more of these preferred entities may occur and to avoid overwhelming the given user for a barrage of information regarding impact events for multiple UPFEs, the STBPA may be configured to prioritize information regarding impact events based a user ranking of multiple UPFEs, in view of a given time of year, in view of a given status for a sports leagues (e.g., in regular season, during playoffs, in off-season, or the like), or other default and/or user preferred prioritization settings. For example, a given user may rank the CHIEFS as their 1UPFE during the NFL regular season, during the NFL playoffs, during a period of weeks preceding the NFL playoffs, during an entire year, or otherwise. The preference operations include determining which of multiple (when so designated) UPFEs to prioritize a searching for and/or presentation of information regarding one or more impact events to the given user and at a given time or during a given period.

As per Operation 406 and for at least one implementation, the preference operations may include retrieving user preference data 202 from a data store, such as the STB data store 200 or another data store. The user preference data 202 may be populated with one or more user preferences using any known and/or later arising processes for collecting and/or determining one or more user preferences. Such operations may include the use of known artificial intelligence and/or machine learning processes that may perform data mining operations that identify one or preferences of a given user based upon viewing habits over a given period of time, such as two or more NFL seasons, items purchased (e.g., the given user purchasing CHIEFS articles of clothing), or otherwise. For at least one implementation, the user preference data 202 may be populated based upon user inputs, such as use of a check box or the like to indicate a "favorite team" or the like. For at least one implementation, the preference operations of Operation 406 may occur repetitively, repeatedly, when requested by a user, based on a schedule, or otherwise. User preference data 202 may be used by the STBPA 106 during the operations of Operation 404 to determine (and update when indicated) the 1UPFE or another nUPFE.

As per Operation 408, the preference operations may include confirming with the user, via the given UD 110, that data regarding impact events for the nUPFE is to be provided to the STBRIA 108. If "NO," the operations proceed to Operation 410. If "Yes," the operations proceed to Operation 416 and Operation 418. Operations 416 and 418 may be performed concurrently, sequentially, or otherwise.

As per Operation 410, the preference operations may include revisiting the nUPFE determination. In revisiting the nUPFE determination, the preference operations may include consideration of user inputs provided in response to the query of Operation 408 as well as user preference data 202.

As per Operation 412, the preference operations may include determining if a given number of iterations of nUPFE determinations, e.g., such as three (3), have occurred or whether the given UD 110 has logged out of the ES 130 or otherwise seeks to terminate a session with respect one or more given nUPFEs (if not all) connecting the given UD 110 with the ES 130. If "NO," with respect to one or more of the nUPFEs, the preference operations may return to Operations 404, 406 and 408 with a new nUPFE being determined in view of the given user's rejection of a previously determined nUPFE and/or any previously determined, but not yet ended, nUPFEs remaining active. For those nUPFEs terminated, an "nUPFE termination message" is sent to the STBRIA. If "YES" with respect to all of the one more nUPFEs, the preference operations proceed to Operation 414.

As per Operation 414, the preference operations may include the UD 110 logging out of a session established with the ES 130 and thereby terminating a providing of information regarding one or more impact events to the given UD 110. When the preference operations are terminated, the STBPA 106 sends a "session terminated message" to the STBRIA 108. It is to be appreciated that the given UD 110 may continue to be connected to the STB 102 and/or other servers 129 for purposes not related to receiving information of impact events, such as being presented with content, or otherwise.

As per Operation 416, the preference operations may include identifying the one more nUPFEs, such as the 1UPFE, to the STBRIA 108. With respect to a given nUPFE, Operation 416 may be performed once during a given session between the UD 110 and the ES 130, and/or repeated on a given interval, basis, or otherwise. The preference operations may then proceed to Operation 412.

As per Operation 418, the preference operations may include the STBPA 106 determining whether one or more of a second UPFE (a "2UPFE") through the nUPFE have been designated and with respect to which the given UD 110 is to receive data regarding impact events. For at least one implementation, it is to be appreciated that a given user may desire to receive information regarding impact events that may affect different entities, such as different teams, players, sports, or otherwise. Operation 418 may be implemented to facilitate notifications of impact events for multiple 1UPFEs. If "YES," the preference operations may proceed to Operation 420. If "NO," the preference operations may proceed to Operation 412.

As per Operation 420, the preference operations may include, with respect to a 2UPFE through an nUPFE, performing one or more of Operations 404-416.

STB Results Implication Application (STBRIA) 108

The STBP 104 may be configured to execute "second" non-transient computer instructions ("2CIs") which instantiate the STBRIA 108. The 2CIs may be stored in the STB data store 200, provided on the Cloud, or otherwise accessible by the STB 102.

Figure 5:
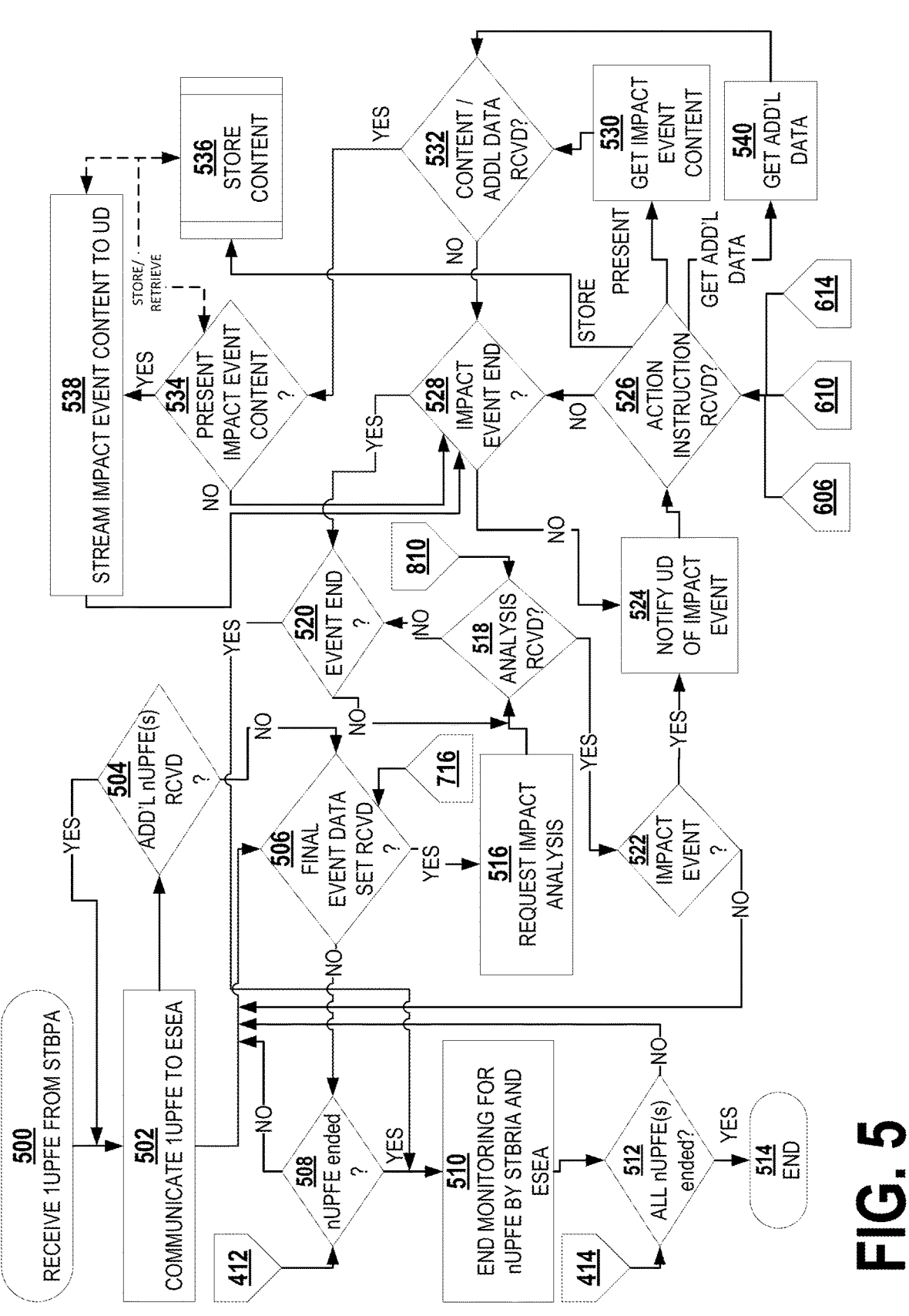
FIG. 5 is a flow chart illustrating operations performed by a results implication application instantiated by a set top box for a sports results implications system and in accordance with at least one implementation of the present disclosure.

As shown in FIG. 5, operations performed by the STBRIA 108 and in accordance with at least one implementation of the present disclosure include operations for detecting an impact event and notifying the given UD 110 of the same (herein, "implication operations") so that the given UD 110, as directed by the given user and/or as automatically instructed a user device event app (UDEA) 114 executing on the given UD 110, may take one or more, if any, subsequent event operations in response thereto.

As per Operation 500, the implication operations may include the STBRIA 108 receiving the 1UPFE from the STBPA 106. As discussed above, the 1UPFE identifies a first preferred entity with respect to which impact events are to be detected, identified to the given UD 110, and/or provided to the given UD 110 for presentation thereby.

As per Operation 502, the implication operations may include the STBRIA 108 communicating the 1UPFE to the ES 130 for processing by the ESEA 134. The operations of the ESEA 134, for at least one implementation of the present disclosure, are described below with reference to FIG. 6.

As per Operation 504, the implication operations may include the STBRIA 108 determining if any other UPFEs have been received from the STBPA 106. Operation 504 may be repeated on any given basis, such as periodically, on a scheduled basis, on demand, or otherwise. If "YES," the implication operations may include repeating operation 502 with respect to a newly identified nUPFE. If "NO," the operations proceed to Operation 506.

As per Operation 506, the implication operations may include the STBRIA 108 awaiting receipt of an event data set from the ESEA 134 by the STB 102—where the event data set identifies at least one presently occurring event or an upcoming event that corresponds to at least one or more of the nUPFE(s) previously received from the STBRIA 108. If the event data set is received by the STBRIA 108, as indicated by the "YES" path, the operations proceed to Operation 516. If the event data set is not received by the STBRIA 108, as indicated by the "NO" path, the operations proceed to Operation 508. A period during which Operation 506 may be performed may be preset, pre-determined, determined by the STB 102 and/or ES 130, specified by a given UD 110, or otherwise specified.

As per Operation 508, the implications operations may include the STBRIA 108 determining if a given nUPFE has ended. For at least one implementation, such determination may be made based upon receipt, by the STBRIA 108, of an nUPFE termination message sent by the STBPA, as per Operation 412. If a result of the determining is "YES," the operations proceed to Operation 510. If "NO," the operations return to Operation 506.

As per Operation 510, the implications operations may include the STBRIA 108 ending the monitoring of the nUPFE by the STBRIA 108 and the ESEA 134.

As per Operation 512, the implications operations may include the STBRIA 108 determining if all nUPFE(s) have ended. For at least one implication, such determination may made upon receiving a session terminated message from the STBPA, as per Operation 414. If a result of the determining is "YES," the operations proceed to Operation 514. If "NO," the operations return to Operation 506.

As per Operation 514, the implications operations end.

As per Operation 516, the implication operations may include the STBRIA 108 requesting an impact analysis of the event data set by the STATS 140. The STATS 140 may perform one or more forms of impact analyses on the event data set to determine if the event data set suggests that one or more events identified in the event data set may qualify as an impact event. Non-limiting examples of such data analysis include a threshold being met, for a given team achieving, by results of a given event, a number of wins and losses over a a given season, as compared to the number of wins and losses for another team in the league over the given season. The given event being identified as one that qualifies for communication of a notification to one or more users. For another non-limiting example, an outcome of a given game, for a given team may result in a change of playoff standing (e.g., with a win the given team's status changing from a "bubble" team to a "final four in" status for the MARCH MADNESS NCAA basketball tournament). For another non-limiting example, an impact analysis may include analyzing one or more performance metrics for a given team versus other teams vying for a playoff spot, or the like. Non-limiting examples of such performance metrics may include wins, losses, ties, points scored, points given, wins against divisional opponents, losses against divisional opponents, and the like.

As per Operation 518, the implications operations may include the STBRIA 108 determining if the requested analysis has been received from STATS 140. It is to be appreciated that the determinations by STATS 140 may involve numerous iterations and when the providing of results from the requested analysis may vary based on the underlying complexity and/or the availability of the data needed for a given analysis. For example, a requested analysis of whether an upcoming NFL game may be an impact event may depend on results form other yet to occur NFL games. If the requested analysis has been not received, as indicated by the "NO" path, the operations proceed to Operation 520. If the requested analysis has been received, as indicated by the "YES" path, the operations proceed to Operation 522.

As per Operation 520, the implications operations may include the STBRIA 108 determining if the event, with respect to which a given analysis was requested, has ended. If "YES," the operations return to Operation 510. If "NO," the operations return to Operation 518.

As per Operation 522, the implications operations may include the STBRIA 108 determining if the analysis received from the STATS 140 indicates that the given event may be an impact event. For at least one implementation, such analysis may be provided by the STATS 140 as per Operation 802. When a given event is determined to not be an impact event, as represented by the "NO" path, the operations return to Operation 506. When a given event is determined to be an impact event, as represented by the "YES" path, the operations proceed to Operation 524.

As per Operation 524, the implication operations may include the STBRIA 108 notifying the UD 110 that an impact event has been identified. The notification may be provided to the UD 110 using any known or later arising communications technologies including text messaging, including in an audio and/or video stream being sent by the STBRIA 108 to the UD 110, or otherwise.

As per Operation 526, the implication operations may include the STBRIA 108 awaiting receipt of one or more "action instructions" from the UDEA 114. As shown, one non-limiting example of an action instruction may include a "present" instruction that is sent by UDEA 114 to the STBRIA 108, as per Operation 606. Another non-limiting example of an action instruction may include a "store" instruction, as per Operation 610. Another non-limiting example of an action instruction may include a "get additional data" instruction, as per Operation 614. If the received action instruction includes a "present" instruction, the operations include Operation 530. If the received action instruction includes a "store" instruction, the operations include Operation 536. If the received action instruction includes a "get additional data" instruction, the operations include Operation 540. If the received action instruction IF "NO," the operations proceed to Operation 528.

As per Operation 528, the implication operations may include the STBRIA 108 determining if the given impact event has ended. For at least one implementation, such determining may also include a determination of the given impact event has started and if no then started set a timer for the start time of the given impact event—the timer indicating when Operation 524 is to be repeated and another notice of the impact event sent to the UD 110. If the impact event has not ended, as indicated by the "NO" path, the operations return to Operation 524. If the impact event has ended, as indicated by the "YES" path, the operations return to Operation 520.

As per Operation 530, the implications operations may include the STBRIA 108 sending a request to the CS 150 for the impact event content. It is to be appreciated that when the impact event has not yet occurred, the impact event content may not then be available. Accordingly and for at least one implementation, Operation 530 may include the setting of a timer by the STBRIA 108 which later instructs the STBRIA 108 to request the impact event content from the CS 150 at substantially the time that the impact event is scheduled to occur, where such substantially occurring time may be plus or minus five (5) minutes before content for the given impact event is indicated, by the CS 150 or another server 129 providing a content availability schedule, as being available for providing to the STB 102 and/or the given UD 110.

As per Operation 532, the implication operations may include the STBRIA 108 determining if impact event content has been received. As discussed above, such determination may be made at any time, such as being determined by the STBRIA 108 based upon when the impact event is scheduled to occur (or has occurred). If "YES," the operations proceed to Operation 534. If "NO," the operations return to Operation 528.

As per Operation 534, the implication operations may include the STBRIA 108 determining if the given user device has instructed the STB 102 to at that time provide the given impact event content to the given UD 110. If "NO," the operations return to Operation 528. A delay period may be associated with the return to Operation 528 based upon if/when the given user device identified when the impact event content is to be provided. For at least one implementation, such designate that the impact event content is to be stored for later use. If so designated, the operations include Operation 536.

As per Operation 536, the implication operations may include the STBRIA 108 storing the impact event content for later presentation, download, storage, access and/or use (herein, "presenting"). Such storing may occur by one or more of the STB 102, the UD 110, the content server 150, another server or device, combinations thereof, or otherwise. For least one implementation, such later presentation may occur at a given later time, after presentation of a given content on the UD 110 ends, upon user selection, or otherwise. To facilitate a later presentation of the given impact event content to the UD 110, the impact event content may be stored by the STB 102 in the STB data store 200, the UD data store 300, or otherwise.

As per Operation 538, the implication operations may include the STBRIA 108 streaming, downloading, broadcasting, multicasting, unicasting, or otherwise communicating (herein, "streaming") the impact event content to the UD 110. As shown, the streamed impact event content may also and/or alternatively stored for later use, as per Operation 536.

It is to be appreciated that the implication operations may occur while a given sports results implications session (an "SRIS") between the user device and the STB is active. Such SRIS may occur over any period, including indefinitely, and may be "active" even when the given user device is not communicatively coupled to the STB 102 at any given time.

As per Operation 540, the implication operations may include the STBRIA 108 engaging with a search engine to identify and obtain additional information regarding an impact event and/or one or more event characteristics of the impact event.

User Device (UD) 110

Figure 3:
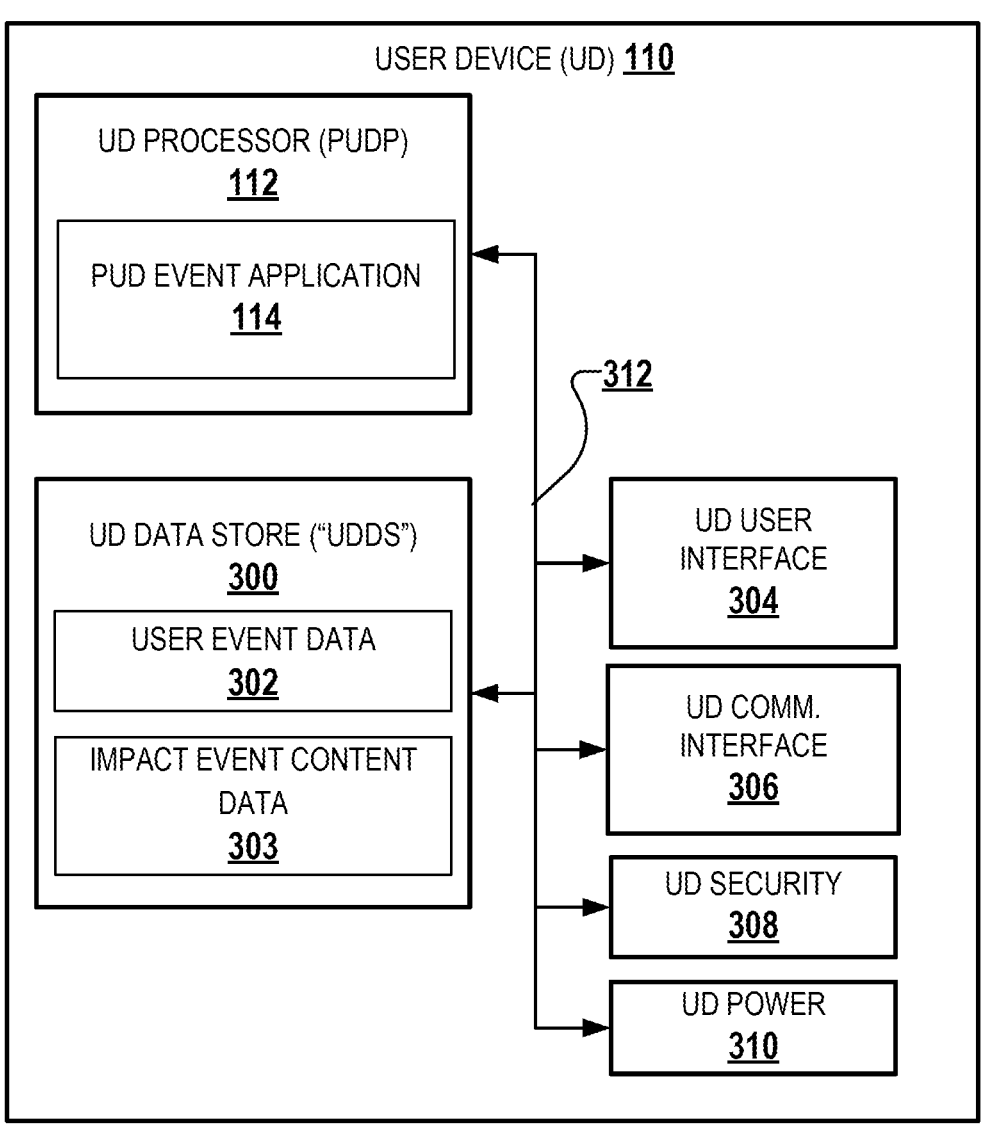
FIG. 3 is a schematic illustration of a personal user device ("PUD") configured for use in the sports results implications system of FIG. 1 and in accordance with at least one implementation of the present disclosure.

As further shown in FIG. 3 and for at least one implementation, the SRIS 100 may include a UD 110. The UD processor (UDP) 112 may execute the user device (UDEA) 114. Other applications, such as content processing applications, web browser applications, and the like may also be executed by the UDP 112. The UD 110 may include a UD data store 300 configured to temporarily store user event 302 and, for at least one implementation, impact event content data 303. Other data may be stored by the UD data store 300. The UD 110 may also include a user device interface 304 (herein, a "UD user interface"), and a communications interface 306 (herein, a "UD communications interface"), a security module 308 (herein, a "UD security module"), and a power module 310 (herein, a "UD power module"). A bus 312 (herein, the "UD bus") couples the UD 110 components.

User Device Event Application (UDEA) 114

The UDP 112 may be configured to execute "third" non-transient computer instructions ("3CIs") which instantiate the UDEA 114. The 3CIs may be stored in the UD data store 300, provided on the Cloud, or otherwise accessible by the UD 110.

Figure 6:
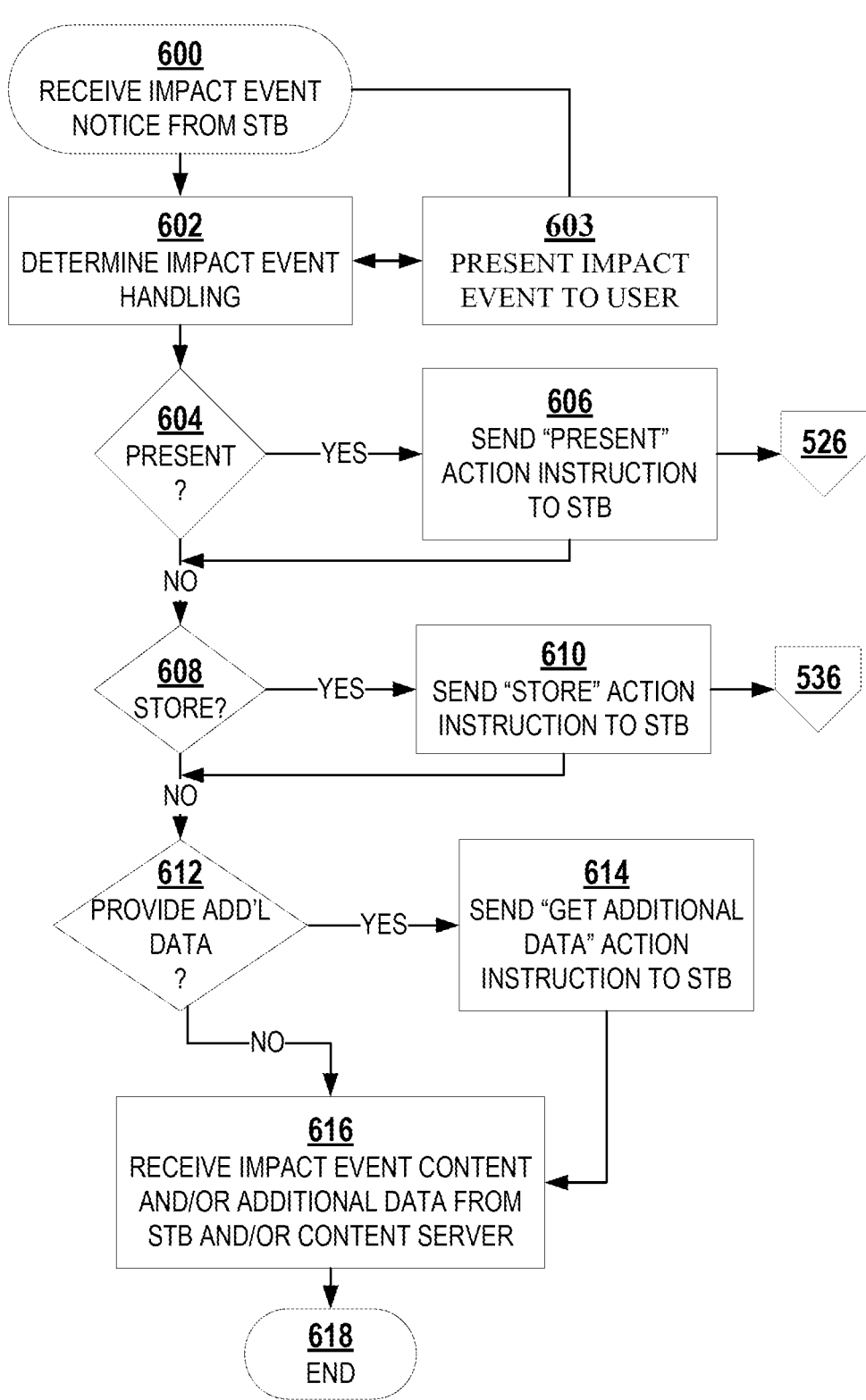
FIG. 6 is a flow chart illustration operations performed by an event application instantiated by a user device for a sports results implications system and in accordance with at least one implementation of the present disclosure.

As shown in FIG. 6, one or more user device event operations performed by the UDEA 114 and in accordance with at least one implementation of the present disclosure include operations for determining how an impact event is to be managed by the STB 102, the UD 110, and other SRIS 100 elements.

As per Operation 600 and for at least one implementation, the user device event operations may begin when the UD 110 receives an impact event notice, from the STB 102, that an impact event has been identified. As discussed above for at least one implementation, the impact event notice may be provided by the STBRIA 108 as per Operation 524.

As per Operation 602, the user device event operations may include the UDEA 114 determining how the SRIS is to manage the impact event. For at least one implementation, the UD 110 may be configured to manually, semi-automatically, or automatically determine how a given impact event is to be managed. For manual management, the operations may include Operation 603. For semi-automatic management, the operations may include using one or more predetermined user impact event settings such as a default setting that results in an impact event being stored for later presentation unless the user device is manually instructed otherwise. For automatic management, the operations may include an automatic setting that applies to the impact event notifications, such as a setting of "notify—but take no further action unless manually (or semi-automatically) instructed otherwise."

As per Operation 603, the user device event operations may include the UDEA 114 presenting the impact event to the user, via the UD 110. The user, via the user device interface 304, may instruct the UD 110 how to manage the impact event with non-limiting examples including "select for presentation now," "store for presentation later," "disregard," or otherwise. Options for identifying and receiving a user instruction may be presented to the given user, via the UD 110, by use of on-screen pop-up messages, chat messages, text message, emails, or otherwise.

As per Operation 604, the user device event operations may include the UDEA 114 determining whether the content for the impact event is to be presented. If "YES," the operations proceed to Operation 606. If "NO, the operations proceed to Operation 608.

As per Operation 606, the user device event operations may include the UDEA 114 sending a "Present" message as an action instruction to the STBRIA 108. The operations proceed to Operation 608.

As per Operation 608, the user device event operations may include the UDEA 114 determining whether the content for the impact event is to be stored. If "YES," the process proceeds to Operation 608. If "NO," the process proceeds to Operation 610.

As per Operation 610, the user device event operations may include the UDEA 114 sending a "store" message as an action instruction to the STBRIA 108. The operations proceed to Operation 612.

As per Operation 612, the user device event operations may include the UDEA 114 determining whether additional information regarding the impact event is to be obtained. If "YES," the operations proceed to Operation 614. If "NO," the operations proceed to Operation 616.

As per Operation 614, the user device event operations may include the UDEA 114 sending a "get additional data" message as an action instruction to the STBRIA 108. The operations proceed to Operation 616. For at least one implementation, when the STBRIA 108 receives a "get additional data" message from the UDEA 114, the STBRIA 108 may engage in a web search or other search for the requested additional data. The get additional data message may specify one or more cha As per Operation 616, the user device event operations may include the UDEA 114 receiving the impact event content and/or the additional data for the impact event indirectly from the STB 102 or directly from a CS 150. It is to be appreciated that, for at least one implementation, a non-specified time lapse may occur between when one or more of Operations 606, 608 and 614 are performed and when Operation 616 occurs. The non-specified time lapse may depend on one or more of when the action instruction is sent relative to when the impact event content and/or additional data are available to send to the UD 110. A person having ordinary skill in the art will appreciate that such unspecified period will depend on actual use conditions and may adjust one or more of the sequence and/or use of one or more of the operations described herein based upon actual use conditions.

As per Operation 618, the user device event operations may end upon the user device receiving the requested impact event content and/or additional data for storage, presentation, or otherwise.

For at least one implementation, the UD 110 may be configured as a presentation device that may include limited, if any, web searching or other communications and/or data processing capabilities. For another implementation, the UD 110 and STB 102 may be functionally combined so that the features and functions of the STB 102 and the UD 110 are provided by a single device.

Event Server (ES) 130

As further shown in FIG. 1 and for at least one implementation, the SRIS 100 may include the event server (ES) 130. The ESP 132 may be configured to execute the event server event application (ESEA) 134. Other applications may be executed by the ESP 132.

Event Server Event Application (ESEA) 134

The ESP 132 may be configured to execute "fourth" non-transient computer instructions ("4CIs") which instantiate the ESEA 134. The 4CIs may be stored in a data store provided by the event server 130, provided on the Cloud, or otherwise accessible by the event server 130.

Figure 7:
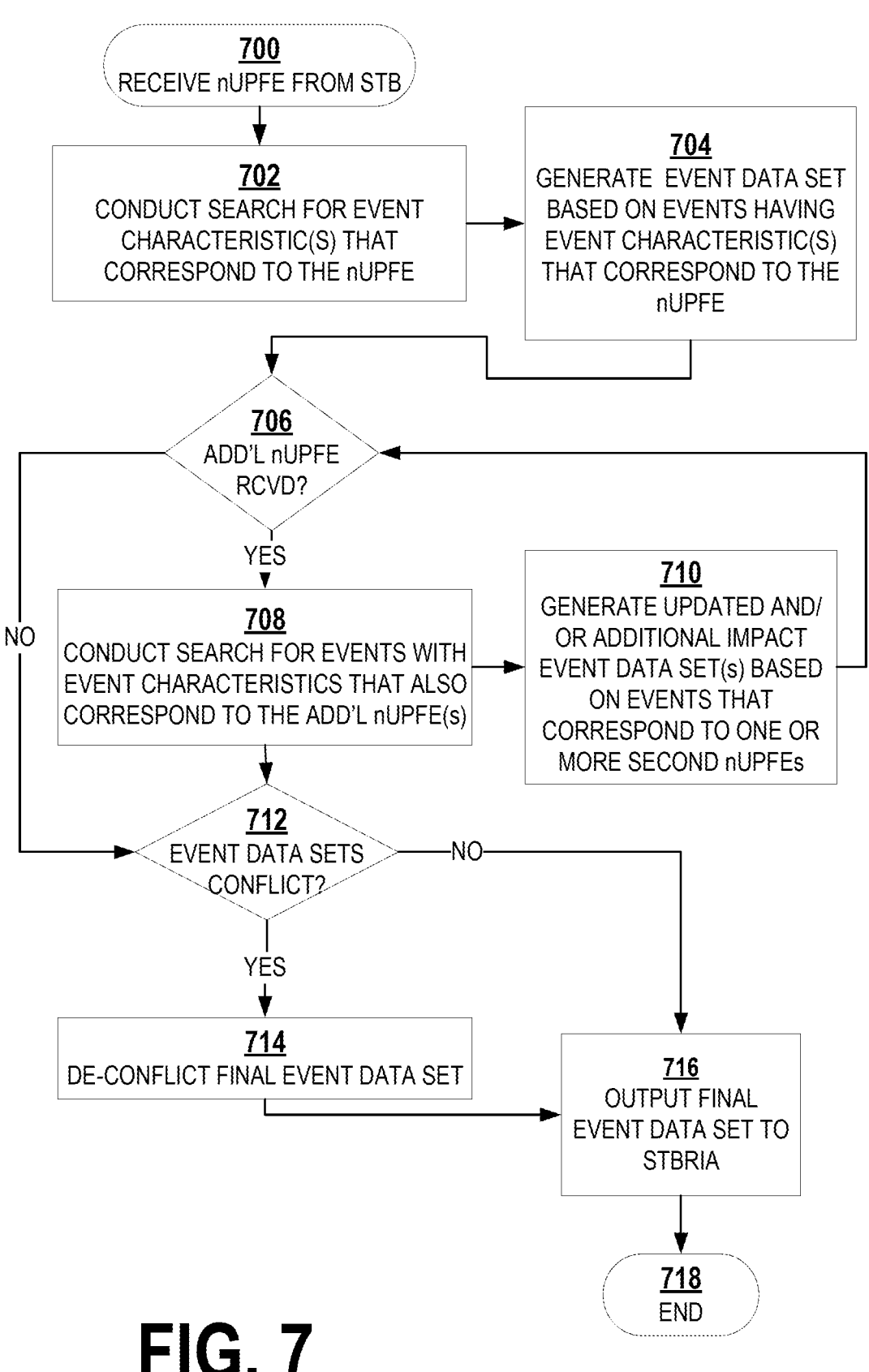
FIG. 7 is a flow chart illustration operations performed by an event application instantiated by an event server for a sports results implications system and in accordance with at least one implementation of the present disclosure.

As shown in FIG. 7, one or more event search operations (each an "ESO") performed by the ESEA 134 and in accordance with at least one implementation of the present disclosure include operations for identifying events that include at least one event characteristic that corresponds to at least one UPFE.

As per Operation 700, the ESOs may include receiving, by the ESEA 134, an nUPFE from the STBRIA 108. As discussed above, a given nUPFE identifies at least one preference for the given user.

As per Operation 702, the ESOs may include the ESEA 134 conducting a database search for event characteristics that correspond to the nUPFE. For at least one implementation, such database search may include a search of the World Wide Web.

As per Operation 704, the ESOs may include the ESEA 134 generating, based on search results obtained per Operation 702, an event data set of one or more events, if any, having one or more event characteristics that correspond to the nUPFE.

As per Operation 706, the ESOs may include the ESEA 134 determining if any additional nUPFEs have been received. If "YES," the operations proceed to Operation 708. If "NO," the operations proceed to Operation 712.

As per Operation 708, the ESOs may include the ESEA 134 conducting another search for events having event characteristics that also correspond to one or more additional nUPFEs.

As per Operation 710, the ESOs may include the ESEA 134 generating an updated and/or additional impact event data set based on one or more events having an event characteristic that corresponds to one or more additional nUPFEs. Operations 706-710 may be repeated until one or more searched for conduct having one or more content characteristics that correspond to one or more of the nUPFEs received from the STB have been completed.

As per Operation 712, the ESOs may include the ESEA 134 execute one or more "deconfliction operations." For at least one implementation, deconfliction operations may include determining if two or more, when existing, event data sets conflict, are redundant, overlap, or otherwise can be condensed into a consolidated event data set. For a non-limiting example, a search may identify a first broadcast of an event, e.g., a CHIEFS game, as occurring at 3 pm while the search may further identify a second broadcast of the CHIEFs game as occurring at a later time, such as at 11 pm. Given that the first broadcast and the second broadcast are likely to contain the same content, the deconfliction operations executed by the ESEA 134 may eliminate one of the two event data sets. If the deconfliction operations result in a finding that the two or more event data sets can be consolidated or otherwise processed, as represented by "YES" path, the operations proceed to Operation 714. If otherwise, the operations proceed to Operation 716.

As per Operation 714, the ESOs may include the ESEA 134 de-conflicting a final event data set. In generating the final event data set, two or more event data sets generated per Operations 704 and 710 by the ESEA 134 may be consolidated or otherwise structured to produce the deconflicted final event data set that identifies one or more events that meet at least one nUPFE, as per Operations 700 and 706.

As per Operation 716, the ESOs may include the ESEA 134 outputting the final event data set to the STBRIA 108.

As per Operation 718, the ESOs end.

STATS Server (STATS) 140

As further shown in FIG. 1 and for at least one implementation, the STATS processor (STATSP) 142 may execute the STATS event application (STATSAPP) 144. Other applications may be executed by the STATSP 142.

STATS Application (STATSAPP) 144

The STATSP 142 may be configured to execute "fifth" non-transient computer instructions ("5CIs") which instantiate the STATSAPP 144. The 5CIs may be stored in a data store provided by the STATS 140, provided on the Cloud, or otherwise accessible by the STATS 140.

Figure 8:
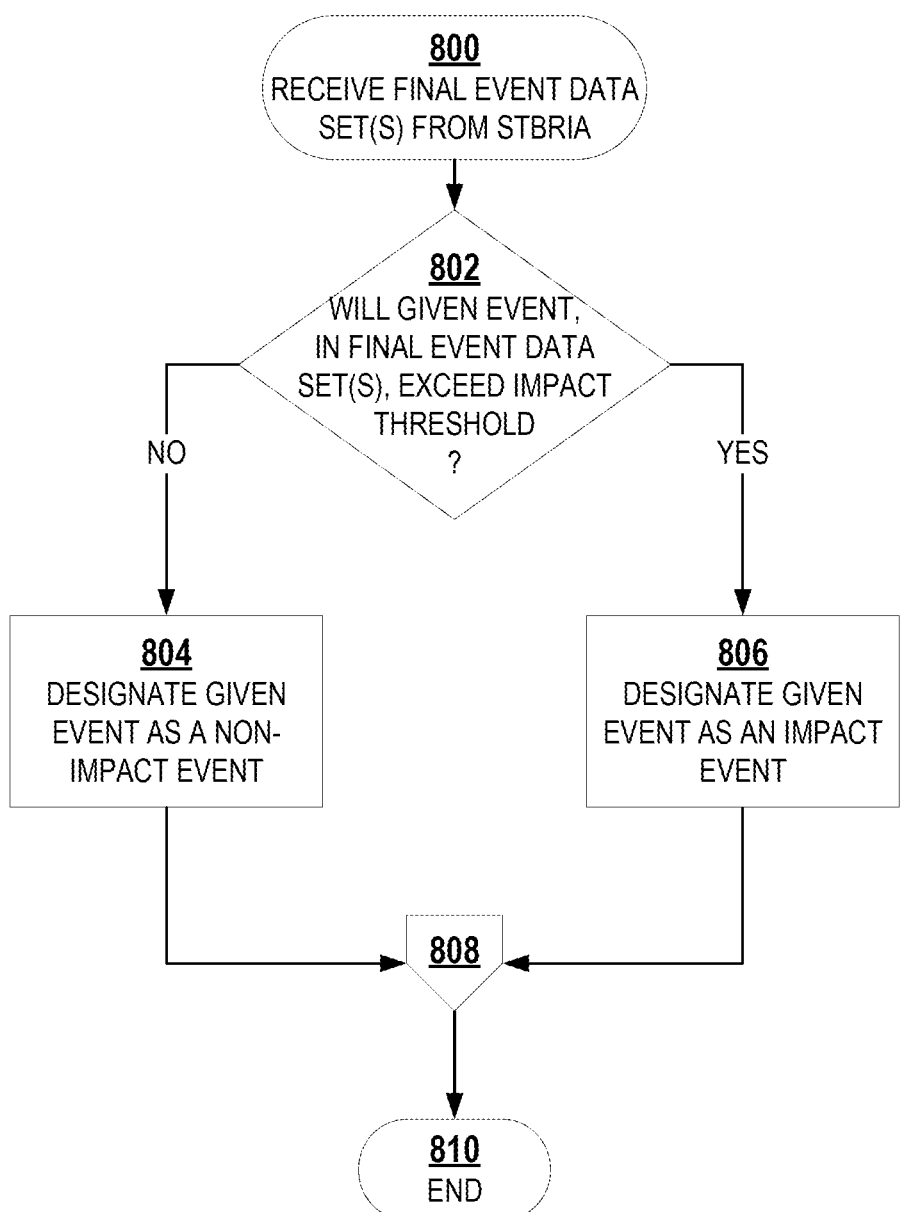
FIG. 8 is a flow chart illustration operations performed by a statistics application instantiated by a server for a sports results implications system and in accordance with at least one implementation of the present disclosure.

As shown in FIG. 8, one or more STATS operations performed by the STATSAPP 144 and in accordance with at least one implementation of the present disclosure include operations for determining whether an identified event, as provided by the ESEA 134 per Operation 716 is an impact event.

As per Operation 800, the STATS operations may include the STATSAPP 144 receiving the final event data set from the STBRIA 108. As discussed above for at least one implementation, the final event data set identifies at least one event that includes at least one event characteristic that corresponds to at least one nUPFE.

As per Operation 802, the STATS operations may include the STATSAPP 144 determining if a given event, identified in the final event data set(s), is likely to exceed an impact threshold. For at least one implementation an impact threshold by be a probability that a result in the given event has a greater than fifty-percent (50%) probability of positively or negatively impacting a standing of the 1UPFE. For another implementation, an impact threshold may be an event that is unrelated to a performance by one or more teams in a given event. For example, an event cancelled or postponed due to weather or other non-performance related factors may exceed an impact threshold. If the given event is likely to exceed an impact threshold, as indicated by the "YES" path, the operations proceed to Operation 804. Otherwise, and as indicated by the "NO" path, the operations proceed to Operation 808.

As per Operation 804, the STATS operations may include the STATSAPP 144 designating a given impact event as a non-impact event.

As per Operation 806, the STATS operations may include the STATSAPP 144 designating a given impact event as an impact event.

As per Operation 808, the STATS operations may include the STATSAPP 144 communicating the designation of the given event as an impact event or as a non-impact event to the STBRIA 108.

As per Operation 810, the STATS operations may end.

It is to be appreciated that the Operations depicted in FIGS. 4-8 may occur in sequence as shown, and/or in any other sequence of operations including one more operations occurring in parallel.

Although various implementations have been described above with a degree of particularity, or with reference to one or more individual implementations, those skilled in the art could make alterations to the disclosed implementations without departing from the spirit or scope of the present disclosure. The use of the terms "approximately" or "substantially" means that a value of an element has a parameter that is expected to be close to a stated value or position. As is well known in the art, there may be minor variations that prevent the values from being as stated. Accordingly, anticipated variances, such as 10% differences, are reasonable variances that a person having ordinary skill in the art would expect and know are acceptable relative to a stated or ideal goal for one or more implementations of the present disclosure. It is also to be appreciated that the terms "top" and "bottom," "left" and "right," "up" or "down," "first," "second," "next," "last," "before," "after," and other similar terms are used for description and ease of reference purposes and are not intended to be limiting to any orientation or configuration of any elements or sequences of operations for the various implementations of the present disclosure. Further, the terms "coupled," "connected" or otherwise are not intended to limit such interactions and communication of signals between two or more devices, systems, components or otherwise to direct interactions; indirect couplings and connections may also occur. Further, the terms "and" and "or" are not intended to be used in a limiting or expansive nature and cover any possible range of combinations of elements and operations of an implementation of the present disclosure. Other implementations are therefore contemplated. It is intended that matter contained in the above description and shown in the accompanying drawings be interpreted as illustrative of implementations and not limiting. Changes in detail or structure may be made without departing from the basic elements of the present disclosure as described in the following claims.

What is claimed is:

1. A system comprising:

a set top box ("STB");

an event server ("ES") coupled to the STB;

a stats server ("STATS") coupled to the STB; and a user device ("UD"), configured for use by a given user, coupled to the STB;

wherein the STB comprises:

an STB processor ("STBP"); and a non-transient STB data store, coupled to the STBP, storing:

first computer instructions ("1CIs") which, when executed by the STBP, instantiate an STB preference application ("STBPA"); and second computer instructions ("2CIs") which, when executed by the STBP, instantiate an STB results implication application ("STBRIA");

wherein the STBPA configures the STB to perform preference operations including:

first determining a first user preferred first entity ("1UPFE"); and first outputting data identifying the 1UPFE to the STBRIA;

wherein the STBRIA configures the STB to perform implication operations including:

requesting a first search, by the ES, for first events that correspond to the 1UPFE;

receiving, from the ES, a search result that includes a first event data set;

wherein the first event data set identifies, as a result of the first search, the first events that correspond to the 1UPFE;

requesting an impact analysis, by the STATS, of the first events identified in the first event data set;

receiving, from the STATS, an impact analysis of the first events; and sending a notification to the UD when the impact analysis identifies at least one of the first events as an impact event.

2. The system of claim 1,
wherein the preference operations further comprise:
second determining whether to provide data for the 1UPFE to the STBRIA; and
when a result of the second determining is positive:
third determining if another UPFE (an "nUPFE") has been designated by the UD; and
when the nUPFE has been designated, outputting data identifying the nUPFE to the STBRIA; and
when the result of the second determining is negative:
performing the first determining again.

3. The system of claim 2,
wherein the first determining further includes:
accessing user preference data that identifies at least one user preference; and
performing the first determining based on the user preference data.

4. The system of claim 3,
wherein the first determining is further performed based on a standing of a given entity identified by the user preference data; and
wherein the given entity is a sports team.

5. The system of claim 1,
wherein the implication operations further comprise:
receiving an action instruction from the UD; and
wherein the action instruction identifies at least one action the STB is to perform with regards to the impact event.

6. The system of claim 5,
wherein the action instruction instructs the STB to perform additional implication operations that include at least one of:
requesting, from a content server ("CS"), a providing of content for the impact event to the UD;
storing the content, for the impact event, for later presentation to the user;
obtaining additional data regarding the impact event; and
providing the additional data regarding the impact event to the UD for presentation by the UD to the given user.

7. The system of claim 6,
wherein the content is provided by the CS directly to the UD.

8. The system of claim 1,
wherein the ES comprises:
an event server processor ("ESP"); and
a non-transient event server data store, coupled to the event server processor, storing third computer instructions ("3CIs") which, when executed by the event server processor, instantiate an event server event application ("ESEA"); and
wherein the ESEA configures the ES to perform the first search by executing event search operations ("ESOs") that include:
identifying, from the first event data set and as the first event, at least one event having one or more event characteristics that correspond to the 1UPFE; and
further generating the first event data set based on results of the identifying.

9. The system of claim 8,
wherein the ESOs further include:
second determining if another UPFE (an "nUPFE") has been designated by the UD;
when a result of the second determining is positive:
second searching for a second event having event characteristics that correspond to the nUPFE;
generating a second event data set;
third determining if the first event, in the first event data set, and the second event, in the second event data set, conflict; and
when the first event and the second event conflict:
de-conflicting the first event data set with the second event data set to produce a final event data set that includes at least one final event; and
outputting the final event data set to the STBRIA.

10. The system of claim 9,
wherein the STATS comprises:
a STATS processor ("STATSP"); and
a non-transient STATS data store, coupled to the STATSP, storing:
fourth computer instructions ("4CIs") which, when executed by the STATS processor, instantiates a STATS application ("STATSAPP");
wherein the STATSAPP configures the STATS to perform the impact analysis by executing STATS operations that include:
receiving the final data set from the ES;
determining if a final event, in the final event data set, will exceed an impact threshold;
designating the final event as an impact event when the determining returns a positive result; and
not designating the final event as an impact event when the determining returns a negative result.

11. The system of claim 10,
wherein the impact threshold is a probability that an event will positively or negatively impact a standing of the 1UPFE.

12. A set top box ("STB") comprising:
an STB processor ("STBP"); and
a non-transient STB data store, coupled to the STBP, storing first non-transient computer instructions ("1CIs") which, when executed by the STBP, instantiate an STB preference application ("STBPA"); and
second non-transient computer instructions ("2CIs") which, when executed by the STBP, instantiate an STB results implication application ("STBRIA");
wherein the STBPA configures the STB to perform preference operations including:
first determining a first user preferred first entity ("1UPFE"); and
first outputting data identifying the 1UPFE to the STBRIA;
wherein the STBRIA configures the STB to perform implication operations including:
requesting a first search, by an event server ("ES"), for first events that correspond to the 1UPFE;
receiving, from the ES, a search result that includes a first event data set;
wherein the first event data set identifies, as a result of the first search, the first events that corresponds to the 1UPFE;
requesting an impact analysis, by a stats server ("STATS"), of the first events identified in the first event data set;
receiving, from the STATS, an impact analysis of the first events; and sending a notification to a user device ("UD") when the impact analysis identifies at least one of the first events as an impact event.

13. The STB of claim 12,
wherein the preference operations further comprise:
second determining whether to provide data for the 1UPFE to the STBRIA; and
when a result of the second determining is positive:
third determining if another UPFE (an "nUPFE") has been designated by the UD; and
when the nUPFE has been designated, outputting data identifying the nUPFE to the STBRIA; and
when the result of the second determining is negative:
performing the first determining again.

14. The STB of claim 13,
wherein the first determining further includes:
accessing user preference data that identifies at least one user preference; and
performing the first determining based on the user preference data.

15. The STB of claim 14,
wherein the implication operations further comprise:
receiving an action instruction from the UD; and
wherein the action instruction identifies at least one action the STB is to perform with regards to the impact event.

16. The STB of claim 15,
wherein the action instruction instructs the STB to perform additional implication operations that include at least one of:
requesting, from a content server ("CS"), a providing of content for the impact event to the UD;
storing the content, for the impact event, for later presentation to the user;
obtaining additional data regarding the impact event; and
providing the additional data regarding the impact event to the UD for presentation by the UD to a given user.

17. A method comprising:
first determining a first user preferred first entity ("1UPFE");
first outputting data identifying the 1UPFE to a set top box results implication application ("STBRIA");
requesting a first search, by an event server ("ES"), for first events that correspond to the 1UPFE;
receiving, from the ES, a search result that includes a first event data set;
wherein the first event data set identifies, as a result of the first search, the first events that corresponds to the 1UPFE;
requesting an impact analysis, by a stats server ("STATS"), of the first events identified in the first event data set;
receiving, from the STATS, an impact analysis of the first events; and
sending a notification to a user device ("UD") when the impact analysis identifies at least one of the first events as an impact event.

18. The method of claim 17, further comprising:
second determining whether to provide data for the 1UPFE to the STBRIA; and
when a result of the second determining is positive:
third determining if another UPFE (an "nUPFE") has been designated by the UD; and
when the nUPFE has been designated,
outputting data identifying the nUPFE to the STBRIA; and
when the result of the second determining is negative:
performing the first determining again.

19. The method of claim 18, further comprising:
accessing user preference data that identifies at least one user preference; and
performing the first determining based on the user preference data.

20. The method of claim 19, further comprising:
receiving an action instruction from the UD; and
wherein the action instruction identifies at least one action the STB is to perform with regards to the impact event.

*     *     *     *     *